Sept. 9, 1952     R. E. RISLEY ET AL     2,610,078
GASKET FOR PIPE JOINTS
Filed Sept. 21, 1945     3 Sheets-Sheet 1
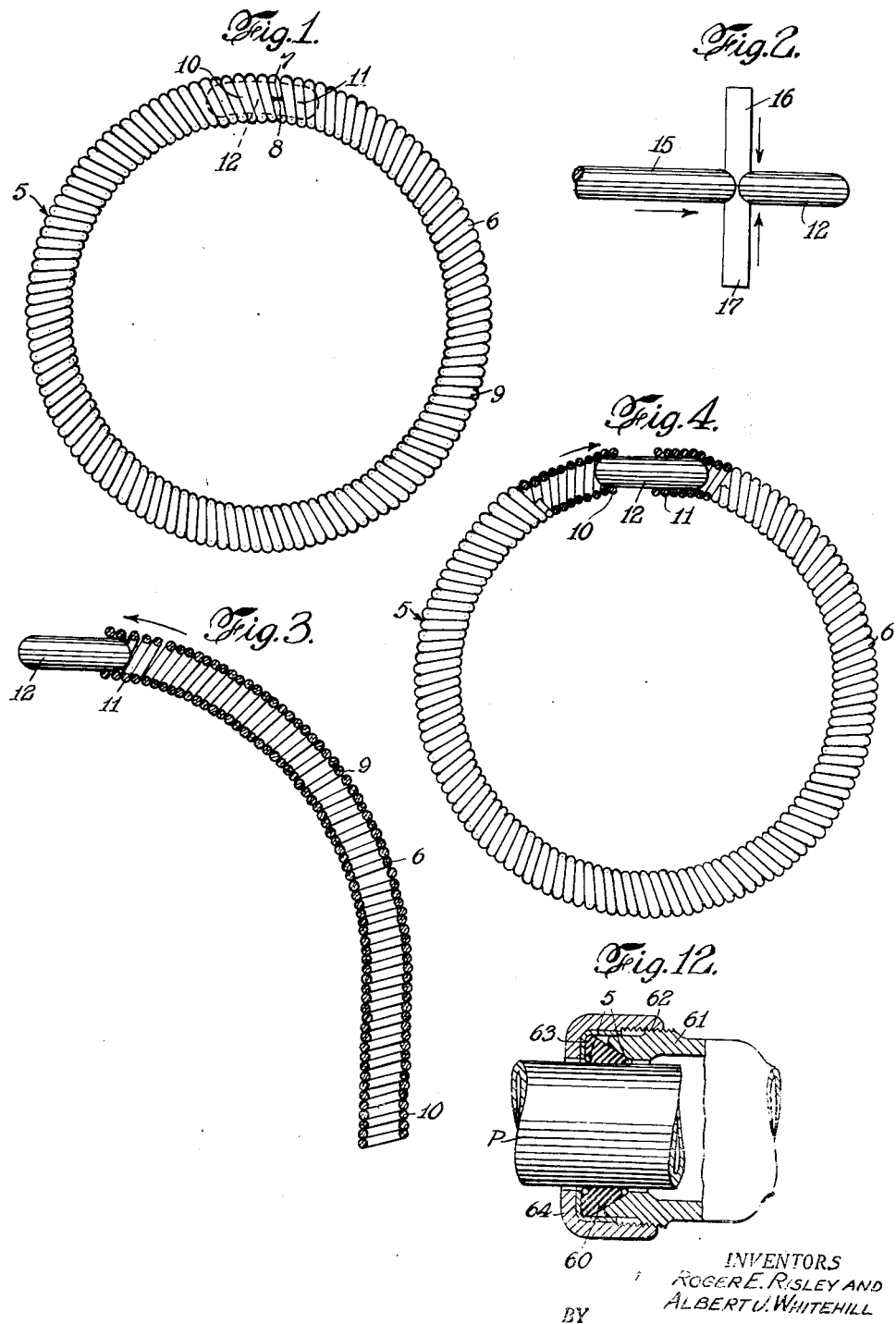
INVENTORS
ROGER E. RISLEY AND
ALBERT J. WHITEHILL
BY
Robert E. Burns
ATTORNEY Sept. 9, 1952  R. E. RISLEY ET AL  2,610,078
GASKET FOR PIPE JOINTS
Filed Sept. 21, 1945  3 Sheets-Sheet 2
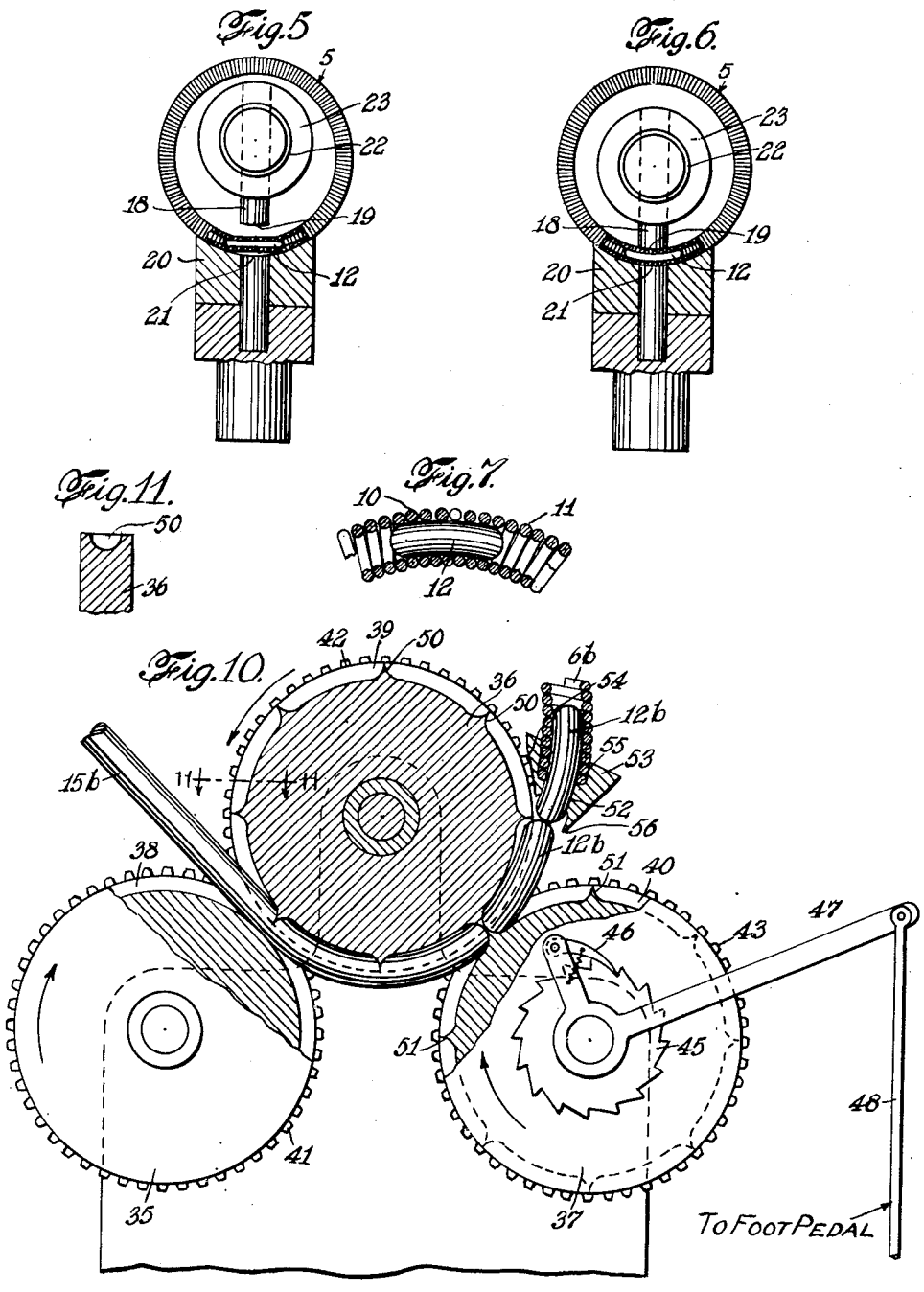
INVENTORS
ROGER E. RISLEY AND
ALBERT J. WHITEHILL
BY
Robert E. Burns
ATTORNEY.

Sept. 9, 1952  R. E. RISLEY ET AL  2,610,078
GASKET FOR PIPE JOINTS
Filed Sept. 21, 1945  3 Sheets-Sheet 3
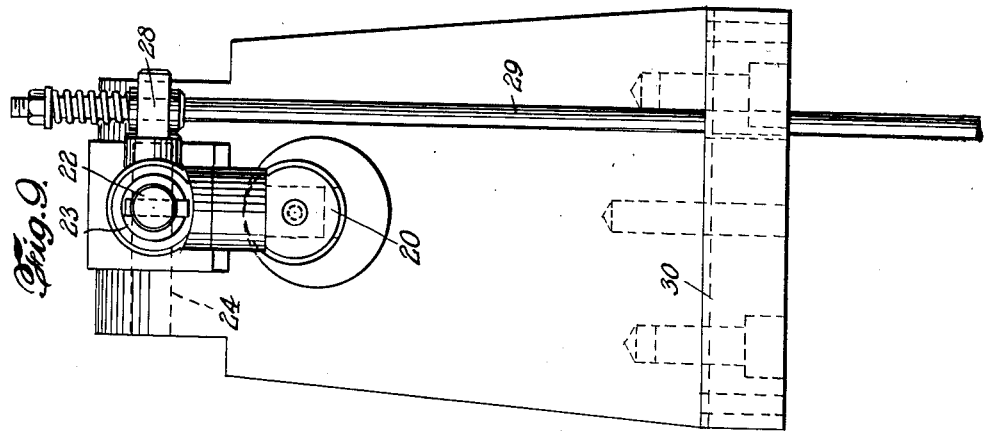
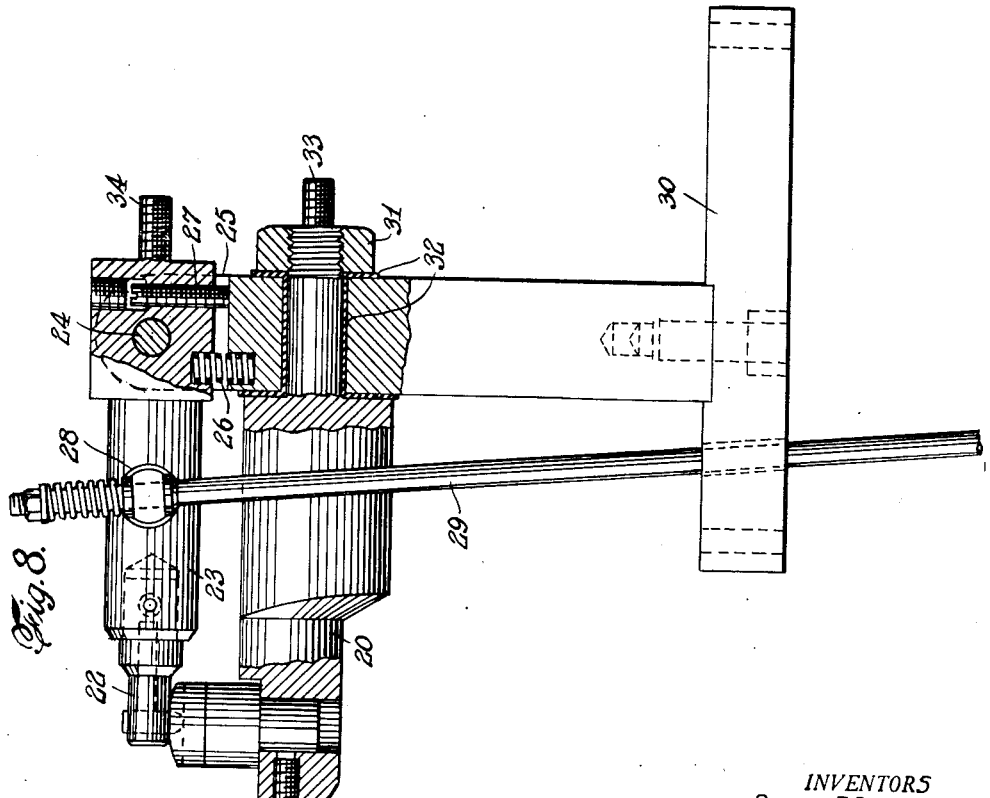
INVENTORS
ROGER E. RISLEY AND
ALBERT J. WHITEHILL
BY
Robert E. Burns
ATTORNEY Patented Sept. 9, 1952

2,610,078

UNITED STATES PATENT OFFICE 2,610,078

GASKET FOR PIPE JOINTS

Roger E. Risley, Bradford, and Albert J. Whitehill, Butler, Pa., assignors to Dresser Industries, Inc., Cleveland, Ohio, a corporation of Pennsylvania Application September 21, 1945, Serial No. 617,756

3 Claims. (Cl. 288—11)

This invention relates to rings of helically coiled wire and to methods of forming the same and more particularly to annular coiled wire rings for use as gasket armor and the like and to methods and means for joining the ends thereof.

In Patent 1,984,806 to George H. Pfefferle there is disclosed an armored gasket and various methods and means for joining armor helices to make endless rings thereof. These have proved very satisfactory for use in many instances and especially where the armor coils are of the larger diameters commonly empolyed. In small fittings, however, such as those requiring armor rings as small as ⅜" I. D. and armor coils of a size as small as $\frac{1}{16}$" O. D. or smaller, it has not proved practical to provide such connections and the commercial art has relied on end-to-end soldered connections. The soldered joint has never been entirely successful. Many such armors break either in molding or in previous or subsequent handling so as to leave an open space between the ends of the armor and thus leave the gasket unprotected at that point.

With the foregoing and other considerations in view, it is an object of the present invention to provide an end-to-end connection for helical coils which is free from substantial tendency to come apart under ordinary conditions of use and which is adapted for armor rings and the like of even very small diameter. Another object is the provision of improved methods for the formation of armor rings and other types of helically coiled parts where simplicity of manufacture and strength of product are desiderata. A further object is the provision of improved apparatus for the use in the formation of armor rings and the like. Other objects of the invention are in part obvious and will in part appear hereinafter.

In the accompanying drawings and the following description several embodiments of the invention selected for the purposes of illustration are shown and described by way of example, the scope of the invention being particularly pointed out in the claims.

In the drawings:

Figure 1 is a side view of an armor ring formed in accordance with the invention and embodying the same;

Fig. 2 is a somewhat diagrammatic view of one step in the formation of such a ring;

Fig. 3 is a similar view of a succeeding step;

Fig. 4 is a similar view of the next step;

Fig. 5 is a partly sectional end view of apparatus adapted to perform a subsequent step, showing the product of Fig. 4 in place;

Fig. 6 is a similar view showing the performance of said subsequent step;

Fig. 7 is a fragmentary sectional view of the resulting connection;

Figs. 8 and 9 are side and front views respectively of the apparatus of Figs. 5 and 6;

Fig. 10 is a transverse sectional view of a form of apparatus and exemplifying a method for the formation of armor ring step-by-step;

Fig. 11 is a fragmentary section along the line 11—11 of Fig. 10; and

Fig. 12 is an elevation partially in section of a pipe fitting utilizing an armored gasket in accordance with the invention.

The armor ring 5 exemplified in Fig. 1 comprises a wire 6 having ends 7 and 8. The wire is helically coiled to provide a helix 9 having continuous coils substantially in contact with each other. The end portions 10 and 11 of the helix 9 are connected by a curved insert 12 to form an annular armor helix. The curvature of the insert is preferably such that the diameter of its smaller arc equals $D+2d$ where $D$ is the inner diameter of the coiled helix and $d$ is the diameter of the wire of which the helix is formed. The insert 12 is desirably a segment of a piece of wire and as exemplified is soldered into the ends 10 and 11 of the helix. As illustrated in Fig. 2, connecting inserts 12 may be provided by cutting off sections from a copper, brass or other wire 15, as by means of relatively movable knives 16 and 17. A connecting insert formed as exemplified in Fig. 2 or otherwise is slipped into one end portion of a helical coil 9 of the required length as shown in Fig. 3. Preferably the insert, or the wire of which it is formed, and end portions of the helix are previously dipped in a flux and the latter dipped in melted or powdered solder which will adhere thereto. Alternatively the solder may be applied to the insert or to both the insert and the helix. One end portion, for example the end 11, is moved over the insert to approximately its center, after which the helix is bent around and the end 10 slipped over the other half of the insert as illustrated in Fig. 4. It will be understood that these steps may be performed simultaneously if desired. The juxtaposed end portions with the insert therein are thereupon subjected to heat and/or pressure to soften the solder and to unite the end portions of the insert to form a secure and permanent connection.

Pursuant to the invention in certain of its aspects, pressure applied in soldering is utilized to convert a straight insert such as exemplified in Figs. 2 to 5 into a curved insert as exemplified in Figs. 1, 6 and 7. In the present instance, soldering and forming pressure is provided by a die or punch 18 having a curved surface 19 (Figs. 5, 6, 8 and 9) adapted to cooperate with a die 20 having a curved surface 21. The punch 18 is mounted in a holder 22 carried on an arm 23 pivoted on a pin 24 supported by a frame member 25. A spring 26 normally holds the punch in an upward position, the extent of upward movement of the punch being limited by an adjustable screw 27 adjustably carried by the arm 23 at a point beyond pivot pin 24. Articulated on the arm 23 at 28 is a link 29 extending to suitable operating means such as a foot pedal (not shown) whereby downward movement of the punch is caused. A frame 30 supports the die 20 and the frame member 25.

The die 20 has a shank portion extending through the frame member 25 and is secured to the frame by a nut 31 screwed on to a threaded portion of the shank. The punch 18 and die 20 are electrically insulated from one another, for example, by insulating material 32 interposed between the die member 20 and the frame member 25. The die 20 and the arm 23 that carries the punch 18 are provided with suitable posts 33 and 34 for connection with suitable conductors for supplying electrical energy to the punch and the die. Preferably the die and punch are connected with a source of low voltage electrical energy such as that employed for example in spot welding.

The ring resulting from the step of Fig. 4 is slipped over the holder 22 with the insert 12 and the juxtaposed end portions 10 and 11 disposed between the surfaces 19 and 21, whereupon pressure is applied on the foot pedal to move the punch 18 downward to bend the insert to the form shown in Figs. 6 and 7. At the same time heat produced by current passing between the punch and die and through the armor, melts the solder and thus bonds the joint permanently. Different dies are provided for coils of different diameters. In cases where the insert 12 has considerable residual resiliency it may be desirable to form the surfaces 19 and 21 with a somewhat smaller radius than the radius of the ring 5 so as to permit a certain amount of resilient straightening of the insert 12 after the ring is removed. In other instances, these surfaces may be curved, as shown, so as to have the same radius as the final ring. Not only may the inserts be cut from straight wire, inserted straight and thereafter be bent either during the soldering operation or in certain instances at other stages, but alternatively the inserts may be curved prior to insertion. This curving step may for example be performed as an individual operation as by the use of pliers having jaws of correct curvature, or an insert may be curved and pressed into one end of the armor coil in a single operation.

In Figs. 10 and 11 there is exemplified a procedure of the latter type and apparatus therefor. In the exemplified method and mechanism a wire is curved and severed step by step and the resulting curved inserts are introduced successively into the ends of helices which are successively brought into position to receive them. To perform this method there is shown a set of rollers 35, 36, and 37 having semi-circular grooves 38, 39, and 40 respectively, as well as intermeshing gear teeth 41, 42, and 43. The gear teeth 41 may, if desired, be omitted as the roller 38 need not be driven. The radius of the roller 36 at the interior of the grooves is substantially equal to the radius of the arc of the insert 12b to be produced. If particularly resilient wire is to be used the radius of the roller is desirably smaller. In order to drive the rollers step by step the roller 37 carries a ratchet 45 adapted to be operated by the pawl 46 mounted on a bell crank 47 from which a link 48 extends to a foot pedal.

A wire 15b is introduced between the rollers 35 and 36 and a partial cut is made therein by each of a series of spaced blades 50 carried in the groove of the roller 36. The wire is then drawn between the rollers 36 and 37, which in cooperation with the roller 37 serve to curve the wire into the groove of the roller 36 and also to cut through the remainder or most of the remainder of the wire at a point opposite the original cut, the roller 37 being provided to this end with a series of spaced blades 51 similar to the blades 50.

As the segments 12b come from between the rollers 36 and 37 they enter an opening 52 in an attachment 53 having an edge portion 54 which just clears the blades 50. If resilient wire is used, the slight straightening of the insert together with the bevel of the cut end will assist its reception. At the rear of the attachment 53 the opening 52 is enlarged as at 55 to receive the end portion of a helix 6b. The attachment 53 may likewise be formed with an edge 56 which will catch an insert 12b as it falls by gravity so as to guide it into the opening 52. Alternatively, the blades 50 and/or 51 may be so formed that as a blade 51 comes together with a blade 50 they will not cut entirely through the wire. In such instances means may be provided to break the continuous connection between two inserts 12b after the foremost of them has been inserted in a helix 6b or such an operation may be performed manually. If desired, means may be provided for positively loosening an insert 12b as it moves toward the opening 52 as by pressure means interiorly of the roller 36 or as by a slight extension on the edge 54 adapted to reach within a notch in the blades 50, a compensating extension being provided, if desired, on the blades 51.

A single operation of the foot pedal at the end of the link 48 will drive the insert 12b into one end of the helix 6b. This end and the half surrounded insert may then be removed and the other end of the helix moved over the remaining end of the insert as in Fig. 4, for example. The insert or the end portions of the helix may have flux and solder applied thereto as above described before the insert is introduced between them, and be subjected to pressure and/or heat to soften the solder to unite the insert firmly within the juxtaposed end portions of the helix and to form an effective and durable endless ring.

In certain instances it is desirable to roughen the longitudinal surfaces of the inserts as by passing a wire, such for instance as shown at 15 or 15b, through knurling rollers and/or by forming the insert with a slightly larger diameter than the interior diameter of the coil, instead of forming it with substantially the same diameter as the inner diameter of the coil as in the arrangement exemplified in Figs. 1–7. By providing a slightly forced fit or a roughened surface or both, the insert tends to be held firmly in position by the coil during the assembly of the parts and will also tend to hold the solder and flux in uniformly distributed position. In a method such as exemplified in Fig. 10 the knurling or roughening of the wire may be accomplished by forming the grooves of the rollers with knurled or roughened surfaces.

The annular armor ring described above is usually incorporated in an annular gasket by being embedded in the rubber composition or other material of the gasket. The armor is preferably located adjacent to the junction of two faces of the gasket angularly disposed to each other as illustrated by way of example in Fig. 12 wherein a gasket 60 is shown with armor rings 5 adjacent its inner and outer ends. Where the armor is molded in the gasket it is immaterial whether or not it is completely filled within the coils with gasket material. It will be found in practice that the gasket material when subjected to vulcanizing heat in the mold will usually enter and fill the interior of the helix but as the elasticity and flexibility of the armor in an axial direction is substantially the same as that of the gasket material this is unimportant. The gasket material will adhere tenaciously to the wire of the armor throughout its entire extent when molded in the gasket so that the armor becomes an integral part of the completed gasket. The adjoining end portions of the armor helix are gripped and resiliently held between the insert and the surrounding rubber compound to maintain the annular form of the helix without materially restricting circumferential expansion of the gasket at the joint in the helix.

In Fig. 12 the gasket 60 is shown by way of example in position in a pipe coupling or fitting having a body portion 61 threaded externally as indicated at 62 and having its end portion shaped to provide an annular gasket recess. Sealing pressure is applied to the gasket by an annular cup-shaped metallic follower 63 and an annular nut 64 which is threaded internally to engage the threads of the body portion 61. The gasket 60 is thus confined in the gasket recess between the pipe P the gasket follower 63 and the end of the body portion 61. The armor ring 5 at the outer end of the gasket prevents extrusion of the gasket material through the space between the gasket follower 63 and the pipe and from any oil, alkali or other material that may be present on the outside of the pipe. The armor ring at the inner end of the gasket prevents extrusion of the gasket material through the space between the pipe and the body portion 61 of the fitting and also protects the gasket material from attack by material inside the pipe.

The armor in accordance with the present invention, thus effectively protects the gasket from injury or damage without however materially impairing the resiliency of the gasket or its sealing value. The armor conforms with the contour of the gasket throughout its circumference and flexes and stretches with the gasket.

Armor rings embodying and formed in accordance with the invention have proved substantially free from breakage under ordinary conditions of use. Not only does the insert reinforce the joint so that it can be readily subjected to bending stresses without breaking, but the presence of the insert creates a capillary condition resulting in a highly effective disposition of the uniting solder.

It will be understood by those skilled in the art that the method described above may be varied within the scope of the appended claims. For example, the individual steps of the method such as severing the inserts from a continuous length of wire curving the inserts to desired form applying suitable flux and solder inserting the inserts in the ends of the coiled wire and applying heat to melt the solder may be varied within obvious limitations. Moreover the term soldering is herein used generically to comprise uniting the insert and the ends of the coil by fusion whether of the same or different material. While armor rings in accordance with the present invention have been shown in Fig. 12 as embodied in a particular type of gasket and a particular coupling or fitting, it will be understood that the invention is in no way limited to this embodiment which is shown merely by way of example. In referring to the gasket as being of "rubber composition" the term is used to include a composition of natural rubber as well as synthetic compositions having similar characteristics adapting them for use as gasket material.

What we claim and desire to secure by Letters Patent is:

1. A gasket for pipe joints comprising a continuous ring of resilient rubber composition, an annular metallic helix of circular cross-section embedded in said composition, said helix having successive turns substantially in contact with one another and having ends abutting one another and a parti-toroidal insert fitting frictionally into the abutting end portions of the helix and having a uniform circular cross-section, adjoining end portions of said helix being gripped and resiliently held between said parti-toroidal insert and the surrounding rubber compound to maintain the annular form of said helix without materially restricting circumferential expansion of said gasket at the joint in said helix.

2. A gasket for pipe joints comprising a continuous ring of resilient rubber composition, an annular metallic wire helix of circular cross-section embedded in said composition, said helix being wound of a length of wire and having successive turns substantially in contact with one another, the end portions of said helix abutting one another, and a parti-toroidal insert fitting frictionally into the abutting end portions of the helix and having a uniform circular cross-section, the adjoining end portions of said helix being gripped and resiliently held between said parti-toroidal insert and the surrounding rubber compound to maintain the annular form of said helix without materially restricting circumferential expansion of said gasket at the joint in said helix, the end portions of the wire abutting one another and being aligned with one another to provide a substantially continuous helix.

3. A gasket for pipe joints comprising a continuous ring of resilient rubber composition, an annular metallic helix of circular cross-section embedded in said composition, said helix having successive turns substantially in contact with one another and having ends abutting one another and a parti-toroidal insert fitting frictionally into the abutting end portions of the helix and having a uniform circular cross-section with a diameter greater than the normal inside cross-sectional diameter of the turns of said helix, said insert extending into each end of the helix a distance of at least three turns, the adjoining end portions of said helix being gripped and resiliently held between said parti-toroidal insert and the surrounding rubber compound to maintain the annular form of said helix without materially restricting circumferential expansion of said gasket at the joint in said helix.

ROGER E. RISLEY.
ALBERT J. WHITEHILL.

(References on following page)

REFERENCES CITED

The following references are of record in the file of this patent:

UNITED STATES PATENTS

| Number | Name | Date |
|---|---|---|
| 218,128 | Mersereau | Aug. 5, 1879 |
| 475,053 | Cabana | May 17, 1892 |
| 623,982 | Chesterton | May 2, 1899 |
| 866,696 | Taylor | Sept. 24, 1907 |
| 895,412 | Badger | Aug. 11, 1908 |
| 1,021,449 | Cox | Mar. 26, 1912 |
| 1,332,658 | Barstow | Mar. 2, 1920 |
| 1,743,587 | Wrighton | Jan. 14, 1930 |
| 1,931,162 | Kranz et al. | Oct. 17, 1933 |
| 1,984,806 | Pfefferle | Dec. 18, 1934 |
| 2,101,349 | Sharp | Dec. 7, 1937 |
| 2,403,070 | Fulton | July 2, 1946 |